(12) United States Patent
Juan

(10) Patent No.: US 8,245,599 B2
(45) Date of Patent: Aug. 21, 2012

(54) TRANSMISSION APPARATUS WITH MULTIPLE CHANNELS

(75) Inventor: Chih-Chen Juan, Taichung County (TW)

(73) Assignee: Yongmart Manufacturing Co., Ltd., Taichung (TW)

( * ) Notice: Subject to any disclaimer, the term of this patent is extended or adjusted under 35 U.S.C. 154(b) by 246 days.

(21) Appl. No.: 12/715,662

(22) Filed: Mar. 2, 2010

(65) Prior Publication Data
US 2011/0214531 A1    Sep. 8, 2011

(51) Int. Cl.
*F16H 37/06* (2006.01)
(52) U.S. Cl. .................. 74/665 B; 74/665 R; 74/665 Q
(58) Field of Classification Search ............... 74/665 A, 74/665 B, 665 D, 665 R, 665 Q; 180/165
See application file for complete search history.

(56) References Cited

U.S. PATENT DOCUMENTS

| | | | |
|---|---|---|---|
| 4,140,195 A * | 2/1979 | Watanabe et al. | 180/205.3 |
| 4,768,607 A * | 9/1988 | Molina | 180/165 |
| 6,371,501 B2 * | 4/2002 | Jenkins | 280/216 |
| 6,487,936 B1 * | 12/2002 | Wu et al. | 74/665 B |

OTHER PUBLICATIONS

U.S. Appl. No. 12/697,552, Title Bicycle With Auxiliary Power System, filed Feb. 1, 2010.
U.S. Appl. No. 12/408,208, Title Auxiliary Power Device of Bicycle, filed Mar. 20, 2009.

* cited by examiner

*Primary Examiner* — Ha D. Ho
(74) *Attorney, Agent, or Firm* — Apex Juris, pllc; Tracy M. Heims

(57) ABSTRACT

A transmission apparatus that can transmit power via different inputs, and release power via specific outputs where the transmission apparatus is connected to a first input and a second input, both of which produce a forward rotation and a rearward rotation, and a first output. A first transmission device is connected to the first input and the first output and is driven to turn by the first input, wherein the first transmission device further has a one way transmission member to transmit the forward rotation of the first input to the first output, and a second transmission device connected to the second input and the first output and is driven to turn by the second input, wherein the second transmission device has a one way transmission member to transmit the forward rotation of the second input to the first output.

12 Claims, 6 Drawing Sheets

TRANSMISSION APPARATUS WITH MULTIPLE CHANNELS

BACKGROUND OF THE INVENTION

1. Field of the Invention

The present invention relates generally to a transmission apparatus, and more particularly to a transmission apparatus with multiple channels between various inputs and outputs.

2. Description of the Related Art

In early days, bicycles were just an economic vehicle for workers and students, until nowadays motorcycles and automobiles gradually replace bicycles and become the main transportation. Recent years, more and more people become aware of a lack of energy supply, and that cycling has an advantage of helping to reduce the production of carbon dioxide. Now bicycles are a popular transportation in many cities.

As a transportation tool to school or work, bicycles should help riders to arrive at the destinations in a faster and easier way. For reaching this goal, bicycles are equipped with a transmission system with which riders may shift to a low gear when riding from a stop point or riding uphill; and shift to a high gear when riding downhill. When bicycle is switched to a lower gear, rider needs less strength to cycle but the bicycle goes slowly. On the contrary, when bicycle is switched to high gear, it may speed up the bicycle but rider has to exert greater strength while cycling.

Years ago, a power bike, which is equipped with a battery and a motor, was presented in the market. Such bike may function like a normal bike, driven by the rider, but the battery and motor may also take over and drive the bike moving when necessary. Such power bike in the market is huge and heavy because of the battery and motor, and when the battery is dead, to ride such bicycle a rider has to exert much greater strength than they do to an ordinary bike.

The present inventor has also invented a bicycle with auxiliary power system (U.S. patent application Ser. No. 12/408, 208), wherein power produced from the vibration during biking is stored in a spring of a power storage device, and be released when necessary to help bicycle moving forwards. After the invention of a bicycle with auxiliary power system, the present inventor also invented a device (U.S. patent application Ser. No. 12/697,552), with which power is transmitted and stored in a power storage device by turning the cranks reversely. In order to make these two ways of storing power cooperate on one bike, the bike has to be equipped with a new transmission apparatus.

SUMMARY OF THE INVENTION

The primary objective of the present invention is to provide a transmission apparatus with multiple channels, wherein power can be transmitted via different inputs, and then be output via specific outputs.

To achieve the objective of the present invention, a transmission apparatus with multiple channels is connected to a first input, which produces forward rotation and reverse rotation; a second input, which produces forward rotation and reverse rotation; and a first output, which is driven to turn. The present invention includes a first transmission device connected to the first input and the first output to be turned by the first input, wherein the first transmission device further has a one way transmission member to transmit forward rotation of the first input to the first output via the first transmission device, and a second transmission device connected to the second input and the first output, and is driven to turn by the second input, wherein the second transmission device has a one way transmission member to transmit forward rotation of the second input to the first output via the second transmission device.

DETAILED DESCRIPTION OF THE INVENTION

Figure 1:
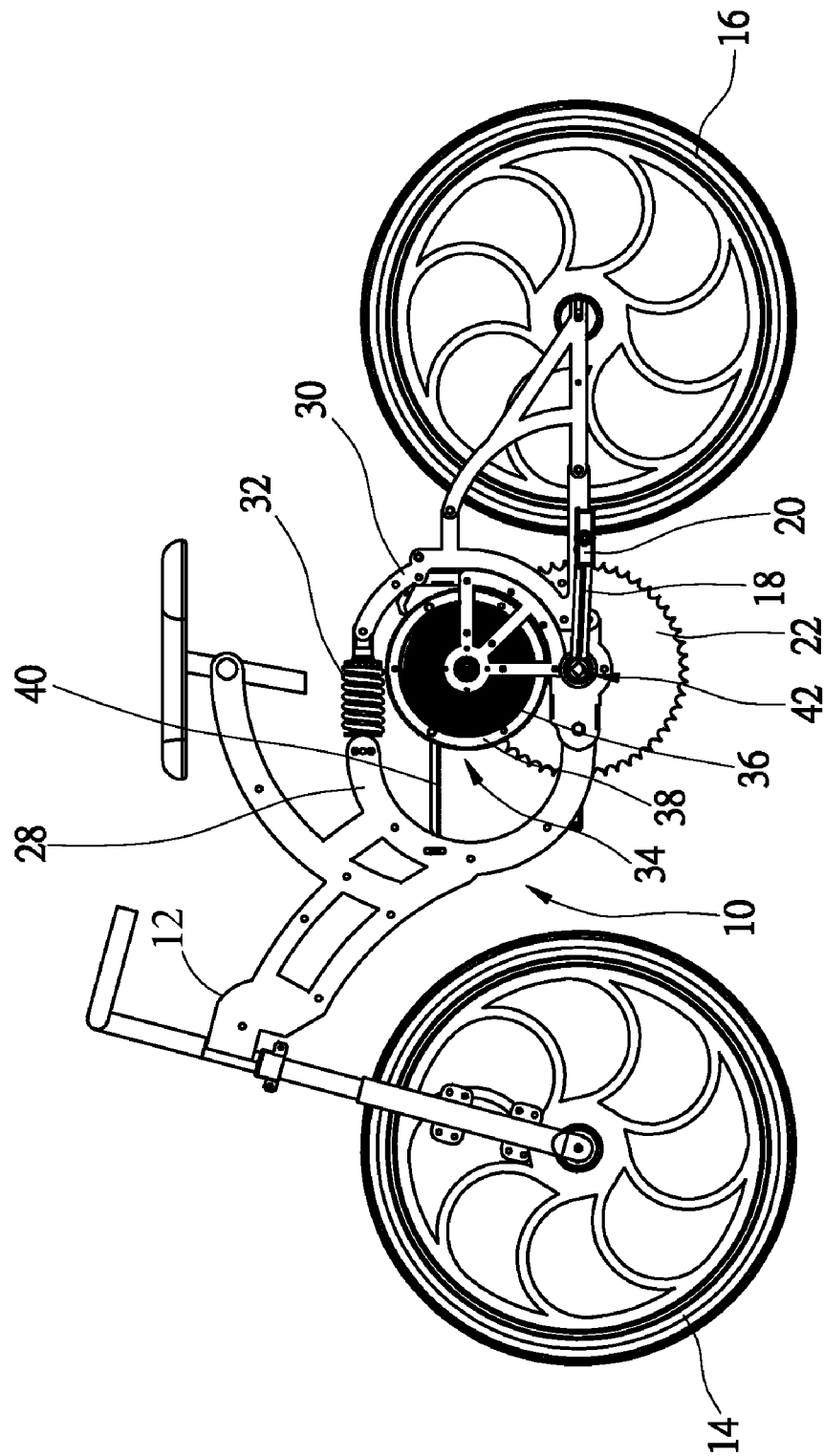
FIG. 1 is a front view of a preferred embodiment of the present invention.

As shown in FIG. 1, the present invention provides a bicycle 10 with a frame 12, a front wheel 14 and a back wheel 16 mounted on the frame 12, a pair of cranks 18 with their outsides connected to a paddle 20, a front sprocket 22 and a back sprocket (not shown) connected by a chain (not shown). The frame 12 has a first section 28 and a second section 30 connected by a buffer 32. A power storage device 34 includes a spring 36 and a gear disc 38 mounted on the second section 30 of the frame 12, and a rack 40 mounted on the first section 28 of the frame 12, and further connected to the power storage device 34. When the first section 28 and the second section 30 produce relative motion because of vibration, the rack 40 produces reciprocating motion against the power storage device 34 for winding the spring 36 and store power in it. Power stored in the power storage device 34 can be released to help bicycle moving forward when necessary. For a detailed structure of above, please refer to U.S. patent application Ser. No. 12/408,208.

Figure 2:
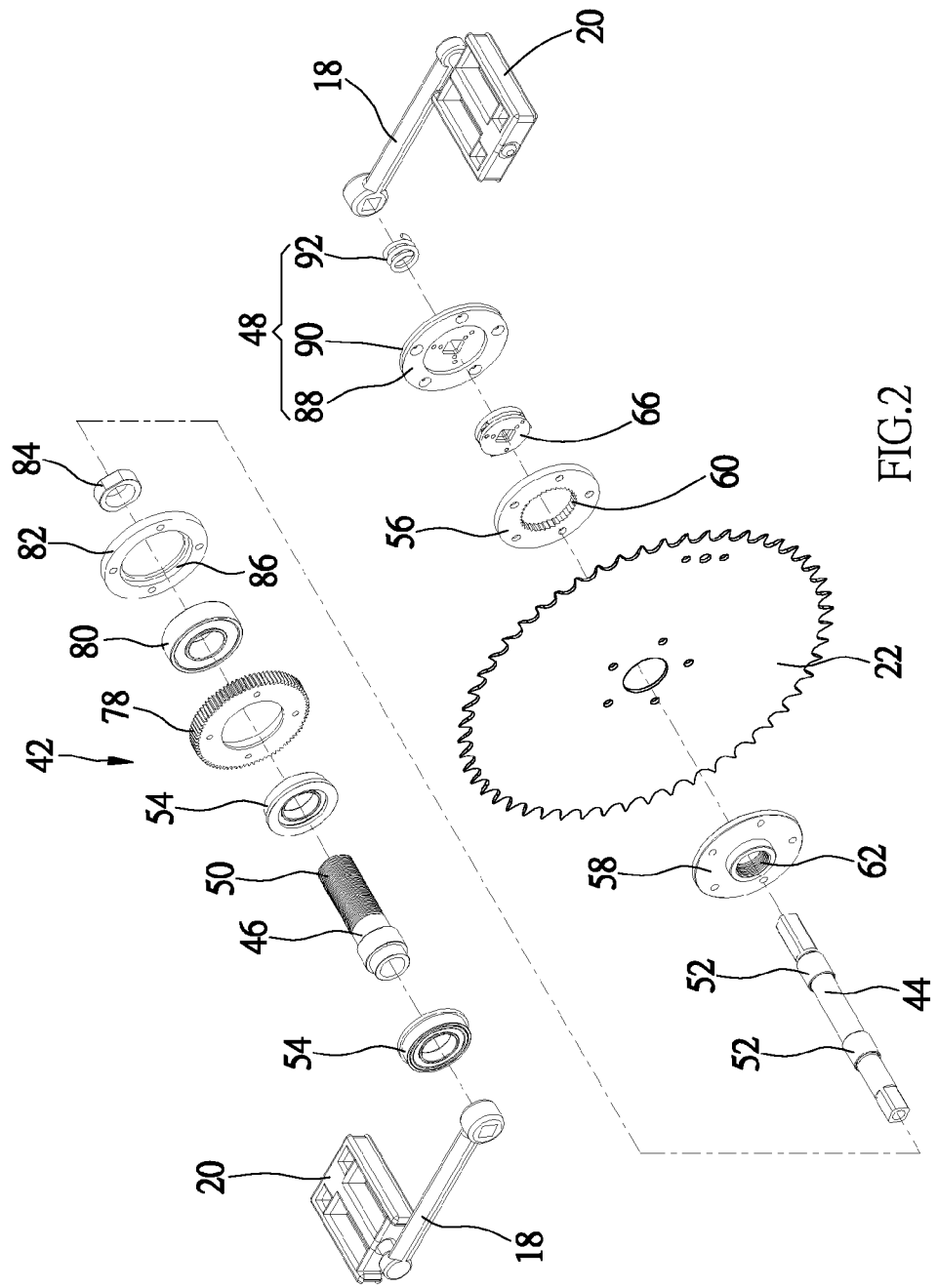
FIG. 2 is an exploded view of the preferred embodiment of the present invention.
Figure 3:
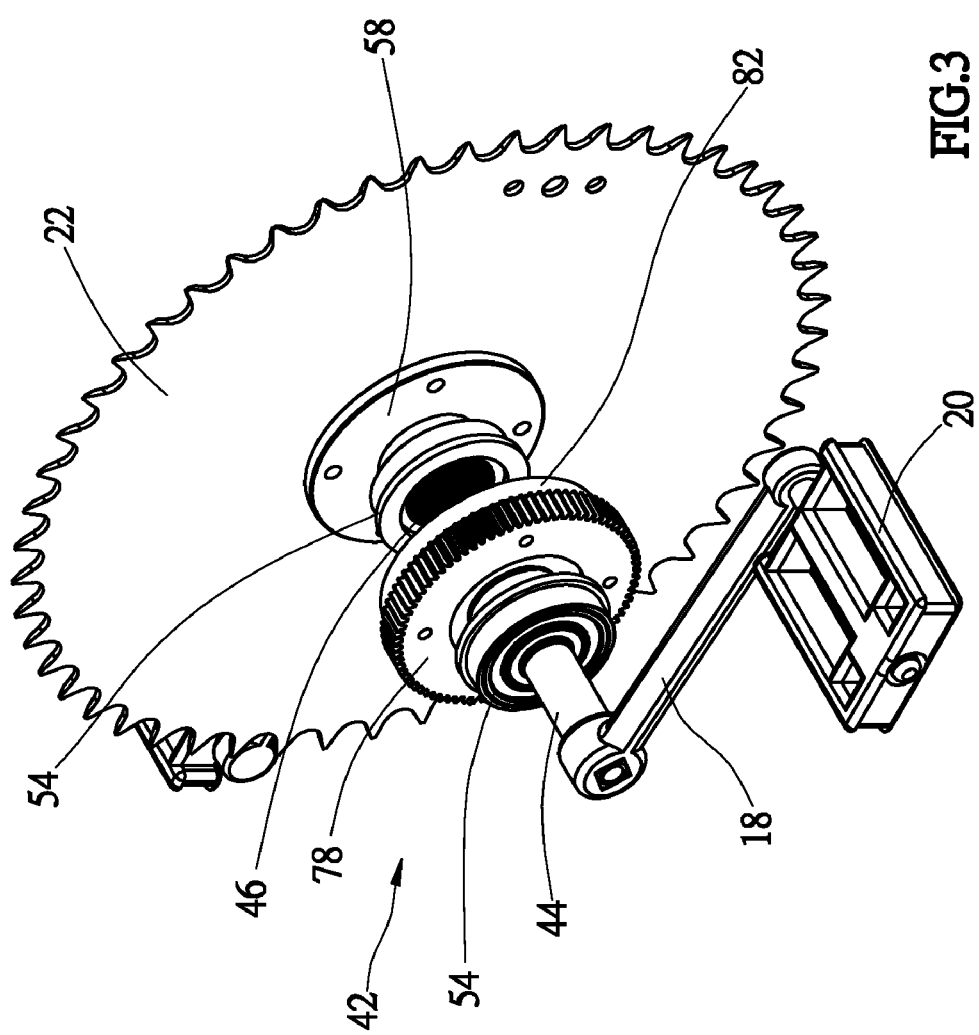
FIG. 3 is a perspective view of the preferred embodiment of the present invention.
Figure 4:
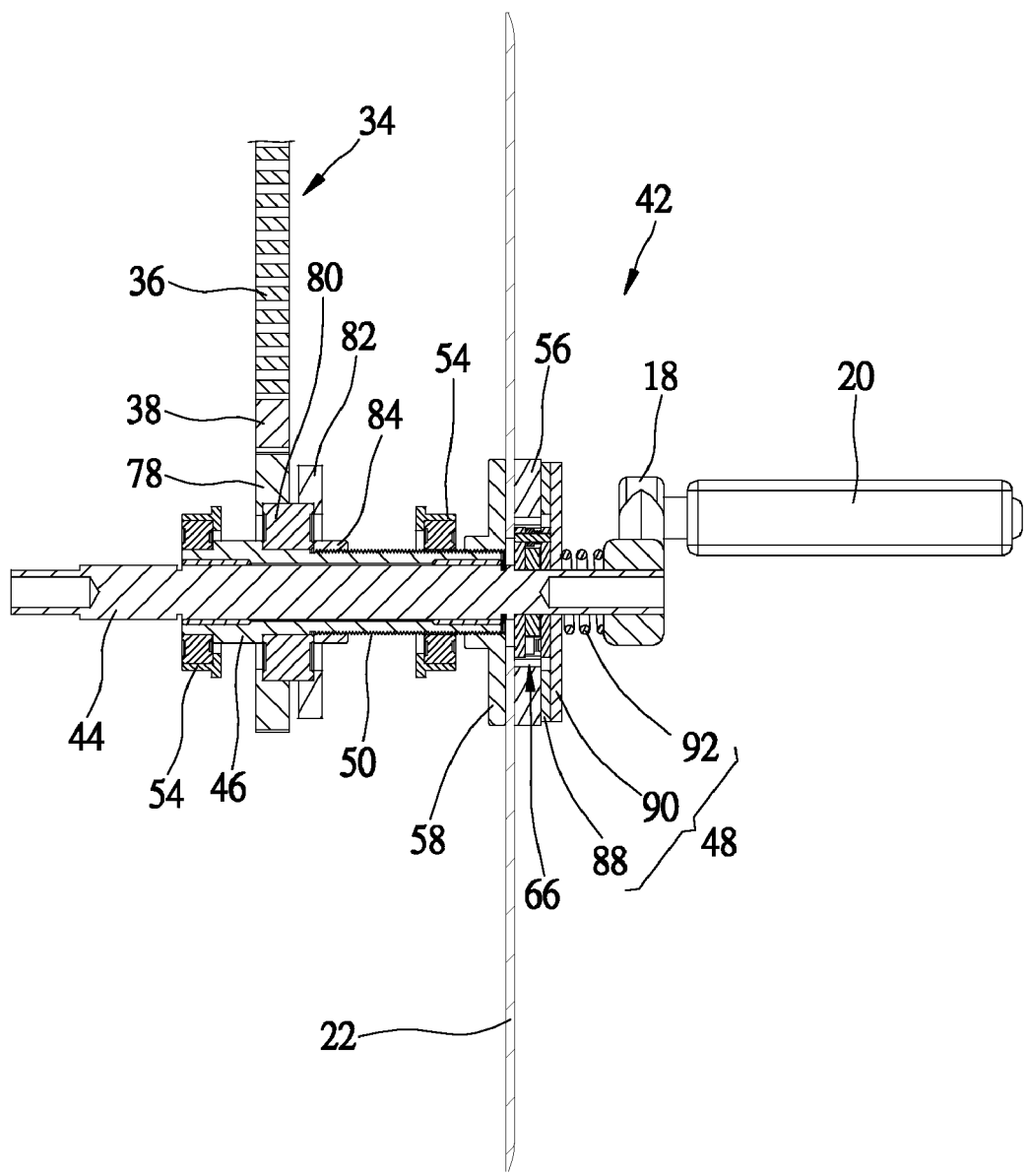
FIG. 4 is a sectional view of the preferred embodiment of the present invention.

FIG. 2 to FIG. 4 show the present invention of a transmission apparatus 42 mounted on the frame 12 with its opposite ends connected to the cranks 18. The transmission apparatus 42 includes a first transmission device 44, and second transmission device 46, and a clutch device 48.

The first transmission device 44 is an axle, with its two opposite ends in rectangular shapes to connect to the cranks 18 respectively. When the cranks 18 are turned, the first transmission device 44 is driven to rotate. The second transmission device 46 is an axle sleeve which has threads 50 on its outside. The first transmission device 44 is capped by the second transmission device 46 with bearings 52 in between, which make enables them to rotate separately. The front sprocket 22 has a through hole at a center thereof that fits the first transmission device 44, which enables it to turn relatively to the first transmission device 44. The second transmission device 46 is mounted with two bearings 54 thereon to couple the first transmission device 44 and the second transmission device 46 to the frame 12.

Figure 5:
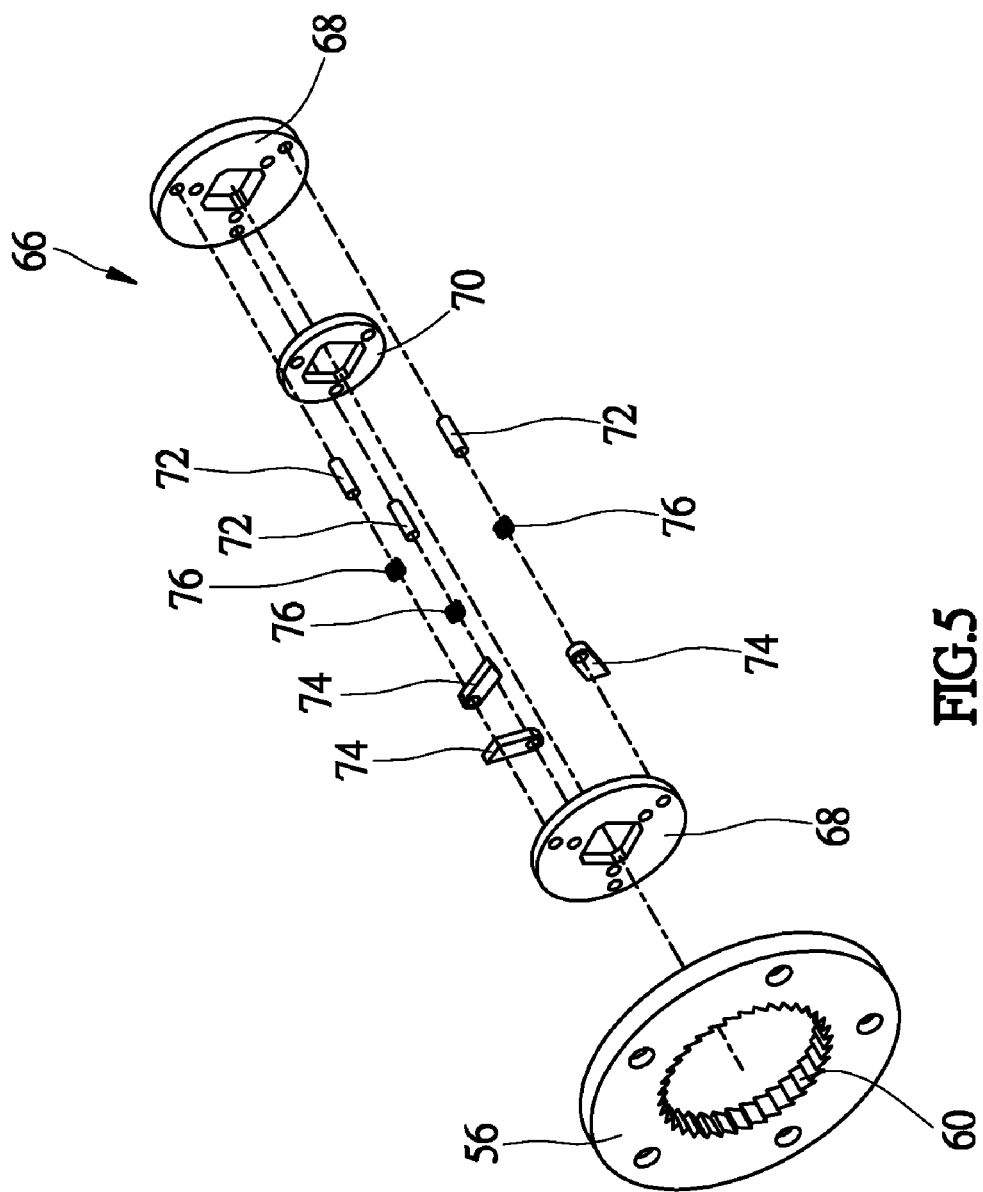
FIG. 5 is an exploded view of the ratchet disc and the paw member of the first preferred embodiment of the present invention.
Figure 6:
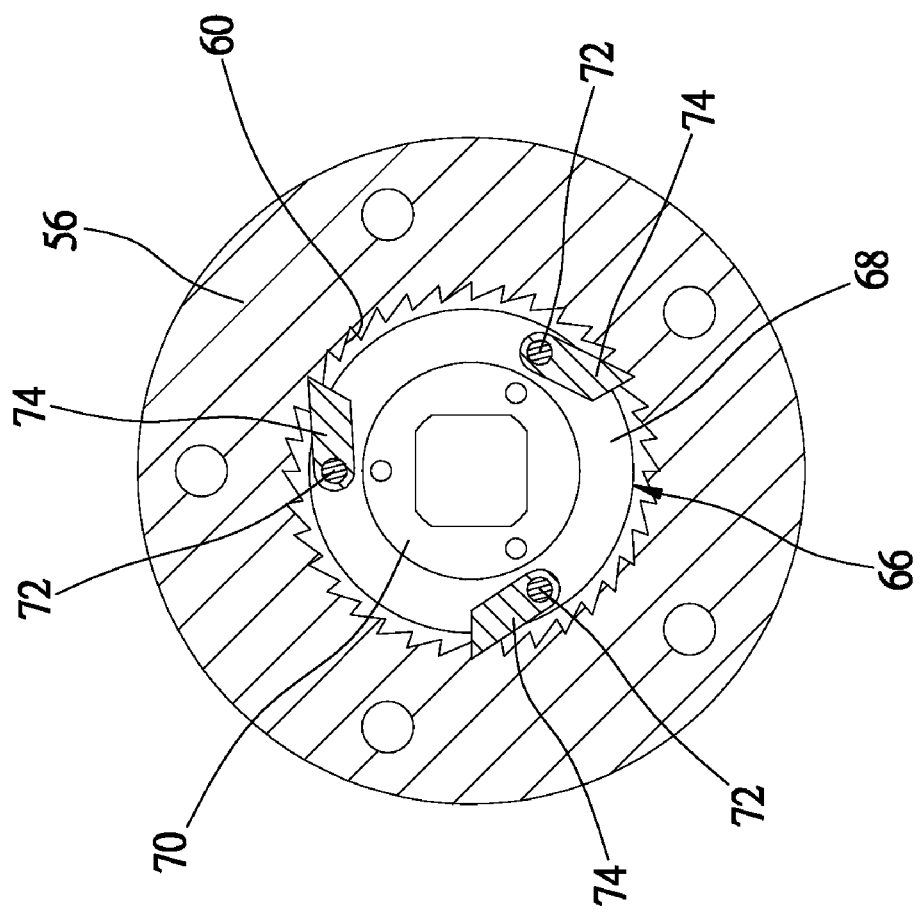
FIG. 6 is a sectional view of the ratchet disc and the paw member.

The front sprocket 22 has a ratchet disc 56 on one side, and a connector 58 on the other. The ratchet disc 56 has a through hole at a center thereof, with teeth 60 on a sidewall of the through hole. The connector 58 has a threaded hole 62 screwed onto the second transmission device 46 so that the front sprocket 22 turns with the second transmission device 46. A paw member 66, which is received in the through hole of the ratchet disc 56, is connected on the first transmission device 44. The paw member 66 turns along with the first transmission device 44. Please refer to FIG. 5 and FIG. 6, the paw member 66 has two round plates 68, and a spacer 70 between the round plates 68. The spacer 70 has a smaller diameter than the round plates 68, and therefore forms a ring space between the round plates 68. Three pins 72 are set in the ring space, with their opposite ends fixed onto the round plates 68 accordingly. Each of the pins 72 is equipped with a paw 74 and a spring 76 thereon. The ratchet disc 56 and the paw member 66 from a one-way transmission member to transmit power in a single direction. When the first transmission device 44 is driven to turn forward, i.e., bike paddles 20 are driven to move forward, the paw 74 of the paw member 66 is engaged with the teeth 60 of the ratchet disc 56 to drive the front sprocket 22 turn forward, and the second transmission device 46 is also driven to move via the connector 58. When the first transmission device 44 is driven to turn rearward, the paw 74 of the paw member 66 is disengaged with the teeth 60 of the ratchet disc 56, the front sprocket 22 and the second transmission device 46 are not driven to turn.

A gear 78 is mounted on the second transmission device 46, whereon a one way bearing 80 fixed by a bearing base 82 and a nut 84 is in between the second transmission device 46 and the gear 78. The bearing base 82 has a recess 86 on one side to be engaged with an outer race of the one way bearing 80. The nut 84 is screwed on the second transmission device 46 against the one way bearing 80. The gear 78 is engaged with the gear disc 38 of the power storage device 34. Functions of the one way bearing 80 are, when the gear disc 38 turns rearward, the second transmission device 46 is driven and turns forward through the gear 78 and the one way bearing 80; when the gear disc 38 turns forward, the second transmission device 46 is not driven to turn. On the contrary, when the second transmission device 46 turns rearward, the gear disc 38 is driven to turn forward through the gear 78 and the one way bearing 80, and when the second transmission device 46 turns forward, the gear disc 38 is not driven to turn.

The clutch device 48 has a pressing board 90 and a spring 92, both of which are fitted to the first transmission device 44 between the ratchet disc 56 and the cranks 18. The pressing board 90 has a brake pad 88 on one side facing the ratchet disc 56. The pressing board 90 has a rectangular hole at a center to be engaged with the rectangular shaped ends of the first transmission device 44, behind the pressing board 90 the spring 92 is fitted to the first transmission device 44, and then such setting is locked by the cranks 18. With such structure, the spring 92 urges the pressing board 90 to press the brake pad 88 onto the ratchet disc 56. The pressure on the pressing board 90 can be changed by adjusting the cranks 18. When the pressure from the pressing board 90 is little, only the forward turning is transmitted to the front sprocket 22 via paw member 66 and ratchet disc 56, not the rearward turning; when the pressing board 90 gives sufficient pressure and makes ratchet disc 56 turn along with the pressing board 90, both forward and rearward turning of the first transmission device 44 drive the front sprocket 22 to turn via the pressing board 90. When the front sprocket 22 turns rearward, it will drive the second transmission device 46 to turn via the connector 58, and then drive the gear disc 38 to turn forward via the one way bearing 80 and the gear 78 to wind up the spring 36.

The present invention offers two ways of storing power for the bicycle. The first one is to use the vibration from riding the bicycle with the present invention to produce relevant motion between the first section 28 and the second section 30, and then wind up the spring 36 of the power storage device 34 via the rack 40 to store power. For details of the function and structure above, please refer to U.S. patent application Ser. No. 12/408,208. The second way is that a rider steps on the cranks 18 rearward, it causes the first transmission device 44 to turn rearward, and then drives the second transmission device 46 to turn rearward via the clutch device 48, the ratchet disc 56, the front sprocket 22 and the connector 58. After that by the one way bearing 80 and the gear 78, the gear disc 38 of the power storage device 34 is driven to turn forward to wind up the spring 36 for storing power. When the spring 36 is wound up to a certain extent and resistance from the spring 36 is greater than friction between the brake pad 88 and the ratchet disc 56, the pressing board 90 can not be driven to turn the ratchet disc 56 anymore, and causes a break off for the power transmission from turning the cranks 18 rearward. This break off works as a protective mechanism and prevents the spring 36 from being overly wound up.

When power is released from the power storage device 34, it drives the gear disc 38 to turn rearward first, drives the second transmission device 46 to turn forward via the gear 78 and the one way bearing 80, and then drives the front sprocket 22 to turn forward via the connector 58 to help biking.

The combination of the ratchet disc 56 and paw member 66 and the one way bearing 80 are both a kind of one way transmission member. Their locations of setting can be switched, or they can be the same devices on both locations.

The transmission device 42 of the present invention can be mounted on any apparatus with multiple inputs and outputs besides bicycle, as specific transmitting channels for input and output. Take the bicycle 10 of the present invention as example, the cranks 18 can be seen as a first input connected to the first transmission device 44; the front sprocket 22 can be seen as a first output connected to the first transmission device 44 via the one way transmission member including the ratchet disc 56 and the paw member 66, which helps to transmit a forward rotation, not a rearward rotation, to the first output, i.e., the front sprocket 22. The power storage device 34 can be seen as a second input, as well as a second output. The power storage device 34 is connected to the second transmission device 46 via a one way transmission member, i.e., the one way bearing 80, and then to the first output, i.e., the front sprocket 22. By this connection the forward rotation of the second input, i.e. power storage device 34, is transmitted to the first output, i.e., the front sprocket 22 via the second transmission device 46. On the other hand, the first transmission device 44 is connected to the second transmission device 46 via the clutch device 48 to transmit the rearward rotation of the first input, i.e., the cranks 18, to the second output, i.e., the power storage device 34, via the first transmission device 44, the clutch device 48, and the second transmission device 46.

What is claimed is:

1. A transmission apparatus, which is connected to a first input, a second input, and a first output, wherein the first input produces a forward rotation and a rearward rotation, the second input produces a forward rotation and a rearward rotation, and the first output is driven to turn, comprising:

a first transmission device connecting the first input and the first output to be driven to turn by the first input, wherein the first transmission device has a one way transmission member to transmit the forward rotation of the first input to the first output via the first transmission device, and a second transmission device connecting the second input and the first output to be driven to turn via the second input, wherein the second transmission device has a one way transmission member to transmit the forward rotation of the second input to the first input via the second transmission device.

2. The transmission apparatus as defined in claim 1, wherein the first transmission device has an axle and the second transmission device has an axle sleeve fitted to the first transmission device with bearings therebetween that the first transmission device and the second transmission device rotate separately along the same axle.

3. The transmission apparatus as defined in claim 1, wherein the one way transmission member of the first transmission device has a ratchet disc having teeth and a paw member having a paw and a spring urging the paw normally engaged with the teeth of the ratchet disc.

4. The transmission apparatus as defined in claim 3, wherein the ratchet disc, which is connected to the first output, has a hole with teeth on a sidewall thereof to receive the paw member therein.

5. The transmission apparatus as defined in claim 3, wherein the paw member has two round plates and a pin with opposite ends connected to the round plates, and the paw and the spring are mounted on the pin.

6. The transmission apparatus as defined in claim 5, wherein the paw member has a spacer between the round plates with a diameter smaller than the round plates and therefore forming a ring space between the round plates for the pins, the paws and the springs.

7. The transmission apparatus as defined in claim 1, wherein the second transmission device has a thread, and a connector with a threaded hole screwed onto the second transmission device, and connected to the first output.

8. The transmission apparatus as defined in claim 1, wherein the one way transmission member of the second transmission device is a one way bearing mounted between the second transmission device and the second input.

9. The transmission apparatus as defined in claim 1, further comprising a clutch device connecting the first transmission device and the second transmission device, wherein the second transmission device is connected with a second output, and the rearward rotation of the first input is transmitted to the second output via the first transmission device, the clutch device and the second transmission device.

10. The transmission apparatus as defined in claim 9, wherein the second input is the same as the second output.

11. The transmission apparatus as defined in claim 9, wherein the clutch device has a pressing board, a brake pad, and a spring pressing the pressing board to make the brake pad in touch with the second transmission device.

12. The transmission apparatus as defined in claim 9, wherein the one way transmission member of the first transmission device has a ratchet disc and a paw member, wherein the ratchet disc has teeth, and the paw member has paws and springs to engage the teeth of the ratchet disc with the paws; and the clutch device has a pressing board having a brake pad and a spring to press the pressing board to make the brake pad in touch with the paw element.

* * * * *